United States Patent
Gilbert et al.

(10) Patent No.: US 6,222,975 B1
(45) Date of Patent: Apr. 24, 2001

(54) SYSTEM AND METHOD FOR DETECTING AND REPORTING THE USE OF OPTICAL FIBERS IN FIBER OPTIC CABLES

(75) Inventors: Albon E. Gilbert, Hoschton, GA (US); Mark R. Jennings, Andover, NJ (US); David Landry, Suwanee, GA (US); Frank S. Leone, Berkley Heights; Richard J. Pimpinella, Hampton, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/209,614

(22) Filed: Dec. 11, 1998

(51) Int. Cl.[7] ....................................... G02B 6/00
(52) U.S. Cl. ............................................. 385/134
(58) Field of Search ................... 385/135, 134, 385/147

(56) References Cited

U.S. PATENT DOCUMENTS 5,394,503 * 2/1995 Dietz, Jr. et al. .................. 385/135
5,689,604 * 11/1997 Janus et al. ........................ 385/134

* cited by examiner

Primary Examiner—Frank G. Font
Assistant Examiner—Michael P. Stafira
(74) Attorney, Agent, or Firm—Gibbons, Del Deo, Dolan, Griffinger & Vecchione

(57) ABSTRACT

A fiber administration system and method of operation that enables an owner of the fiber administration system to pay for only the external optical fiber cables used by that fiber administration system. The fiber administration system has at least one fiber distribution shelf on which are located a plurality of optical connection ports. Each of the optical connection ports terminate the end of a different external optical fiber. Each of the optical connection ports contains a sensor for detecting when that optical connection port is engaged by an optical coupling within the fiber administration system. A monitoring module is provided that is coupled to the sensor of each of the optical connection ports. The monitor module determines from each sensor whether or not an optical coupling has engaged each optical connection port and records when each of the optical connection ports is first engaged. The data record recorded by the monitor module can be accessed from a remote location for billing purposes.

18 Claims, 2 Drawing Sheets

SYSTEM AND METHOD FOR DETECTING AND REPORTING THE USE OF OPTICAL FIBERS IN FIBER OPTIC CABLES

RELATED APPLICATIONS

This application is related to co-pending U.S. patent application Ser. No. 09/209,221 filed Dec. 11, 1998, entitled, A Fiber Distribution Shelf Assembly For A Fiber Administration System Having Integral Line Tracing Capabilities, which is assigned to Lucent Technologies, the Assignee herein.

BACKGROUND OF THE INVENTION

1. Field of the Invention

The present invention relates to systems that monitor which optical fibers from a grouping of optical fiber cables that a commercial user is using. More particularly, the present invention relates to systems that monitor the use of optical fibers in optical cables for the purpose of billing for such usage.

2. Description of the Prior Art

There are many applications that utilize an optical fiber network to establish optical communications between a host digital terminal (HDT) at a central office and an optical network unit (ONU) at a remote location. Such optical fiber networks are commonly used by telecommunication providers and cable providers, just to name a few.

When an optical fiber network is being built, the owner of the fiber administration system decides how many optical fiber pathways are to be provided between different points in the optical fiber network. Once the number of optical fiber pathways is determined, the owner of the optical fiber network either purchases and installs new optical fiber cable or leases existing optical cable that may lay between the various points that must be interconnected.

The most expensive part of having an optical fiber network built is the cost of running the optical fiber cables between points. Often the optical fiber cables are buried under roadways or must be pulled through existing utility conduits. Such procedures are time consuming, expensive and can not be done at will. Even if optical fiber cable is purchased and installed by the optical fiber network owner, that owner often runs the optical fiber conduit through existing underground conduit under a lease agreement with the owner of the conduit. Accordingly, the owner of fiber optic networks must pay substantial leasing fees for running the optical fiber cable, in addition to the cost of the optical fiber cable and the direct cost of its installation.

Recognizing that running optical cable is one of the largest expenses in developing an optical fiber network, the owners of fiber optical networks typically run more optical fiber than they currently need between points. This way, if more optical fiber pathways are needed in the future, the cost of running new optical fiber cable can be avoided.

A problem that has occurred in recent years is that the owners of optical fiber networks have routinely underestimated the growing use of optical fiber communications. As a result, optical fiber networks have quickly used up all of the available optical fiber pathways, even those extra pathways not planned for immediate use. Many owners of optical fiber networks now have no choice but to run new optical fiber cable.

One solution to this problem would be for the owner of an optical fiber network to run much more optical cable than will be needed. The obvious downside to this strategy is that optical fiber is expensive to purchase and to install. Many owners of optical fiber networks, therefore, do not want to buy and run extra optical fiber cable that they may never need.

A need therefore exists for a system and method that would allow the owner of an optical fiber network to run much more optical fiber than is currently needed, wherein the owner of the optical fiber network will only be responsible financially for the optical fiber pathways being used.

SUMMARY OF THE INVENTION

The present invention is a fiber administration system and method of operation that enables an owner of the fiber administration system to pay for only the external optical fiber cables used by that fiber administration system. The fiber administration system has at least one fiber distribution shelf on which are located a plurality of optical connection ports. Each of the optical connection ports terminate the end of a different external optical fiber. Each of the optical connection ports contains a sensor for detecting when that optical connection port is engaged by an optical coupling within the fiber administration system. A monitoring module is provided that is coupled to the sensor of each of the optical connection ports. The monitor module determines from each sensor whether or not an optical coupling has engaged each optical connection port and records when each of the optical connection ports is first engaged. The data record recorded by the monitor module can be re-accessed from a remote location, wherein the owner of the fiber administration system can be billed for the number of external optical fibers being used by that fiber administration system.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Since a central office serves as the point of origin for the optical fibers in the optical fiber network, fiber administration systems are typically used at the central office to manage the flow of optical signals as they are directed to the various ONUs along the different optical fibers in the network.

Figure 1:
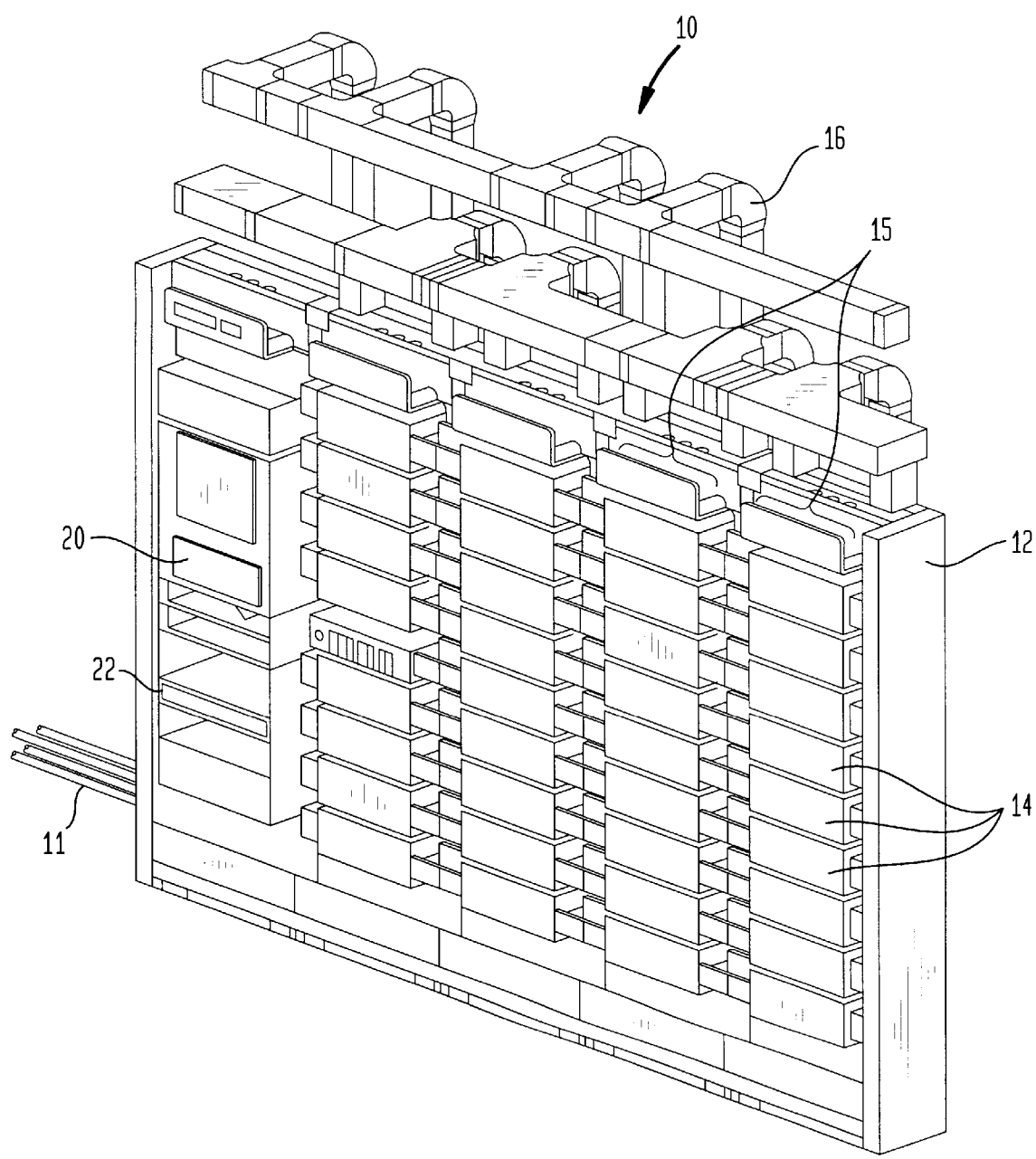
FIG. 1 is a perspective view of an optical fiber administration system containing a first plurality of bays and a second plurality of fiber distribution shelves in each bay.

In many fiber administration systems, as the optical fibers in a network enter the central office, they are directed into an optical distribution frame where the individual optical fibers are terminated in an organized manner. In FIG. 1, a fiber administration system 10 is shown. The fiber administration system 10 is coupled to a plurality of different optical cables 11 that run external to the central office. The optical fibers in some of the cables 11 are currently needed. Many other optical fibers in the optical fiber cables 11 are reserved for future use, should the needs of the fiber administration system 10 expand. The extra optical fibers that are not being used are given to the owner of the fiber administration system for free or for a nominal fee. Accordingly, there is little or no cost for creating a fiber administration system 10 that has many more optical fibers than are currently needed.

The exemplary fiber administration system 10 includes an optical fiber distribution frame 12 that is affixed in a set position to the floor of a central office. The fiber distribution frame 12 defines a plurality of bays 15. Each bay 15 is a vertical structure that supports a plurality of fiber distribution shelves 14. The fiber distribution shelves 14 come in one of the three standard sizes, having a five inch height, a seven inch height or a nine inch height. A network of conduits 16 lead the various optical fibers from the external optical fiber cables 11 to the fiber distribution shelves 14. Some of the optical fibers come from optical fiber cables 11 that are being used and other optical fibers come from optical fiber cables 11 that are reserved for use in the future.

On each of the fiber distribution shelves 14 are a plurality of optical connection ports that terminate the ends of all of the individual optical fibers that enter the central office and are contained within the external optical fiber cables 11. By terminating each optical fiber at an optical connection port on one of the different fiber distribution shelves, the location of each optical fiber becomes known within the overall fiber administration system 10. Once terminated at a known address on one of the fiber distribution shelves 14, each optical fiber can be selectively coupled to a HDT or a variety of other optical equipment located at the central office. As a result, the optical signals sent along each optical fiber can be selectively controlled.

A fiber administration system 10 may contain dozens of fiber distribution shelves 14. A typical fiber distribution shelf 14 holds between seventy two and one hundred and eight optical connection ports. As such, a fiber administration system may contain hundreds or thousands of optical connection ports that terminate optical fibers from external optical fiber cables. In the shown embodiment, however, some of the optical connection ports lead to active optical fibers that are currently in use. Other optical connection ports attach optical fibers that are not yet being used.

In addition to the fiber distribution shelves 14, the fiber administration system 10 also includes a systems controller 20. The systems controller 20 runs the software used in the line tracing operations of the fiber administration system 10. In addition to the systems controller 20, at least one monitoring module is provided The monitoring module is preferably part of the circuitry contained in each of the fiber distribution shelves 14. However, the monitoring module can also be an individual unit that is electrically coupled to each of the fiber distribution shelves 14. In FIG. 1, the monitoring module 22 is shown as a separate unit to better illustrate its presence in the overall fiber administration system. The purpose of the monitoring module 22 will later be described.

In co-pending U.S. patent application Ser. No. 09/210,292 filed Dec. 11, 1998, and entitled, A Fiber Distribution Shelf Assembly For A Fiber Administration System Having Integral Line Tracing Capabilities, a system is described wherein each of the optical connection ports on a fiber distribution shelf contains a sensor. The sensor can detect when a connector coupling from an optical fiber is inserted into an optical connection port. Each sensor is coupled to the systems controller. Accordingly, the systems controller can detect which of the optical connection ports are in use and which ones are not. Since each optical connection port leads to an optical fiber in one of the optical fiber cables, the systems controller can detect which of the fibers in the supply of optical fiber cables are being used. The present invention contains a detection system such as that described in the cited co-pending application. The disclosure of the cited co-pending patent application is therefore incorporated into this disclosure by reference.

Figure 2:
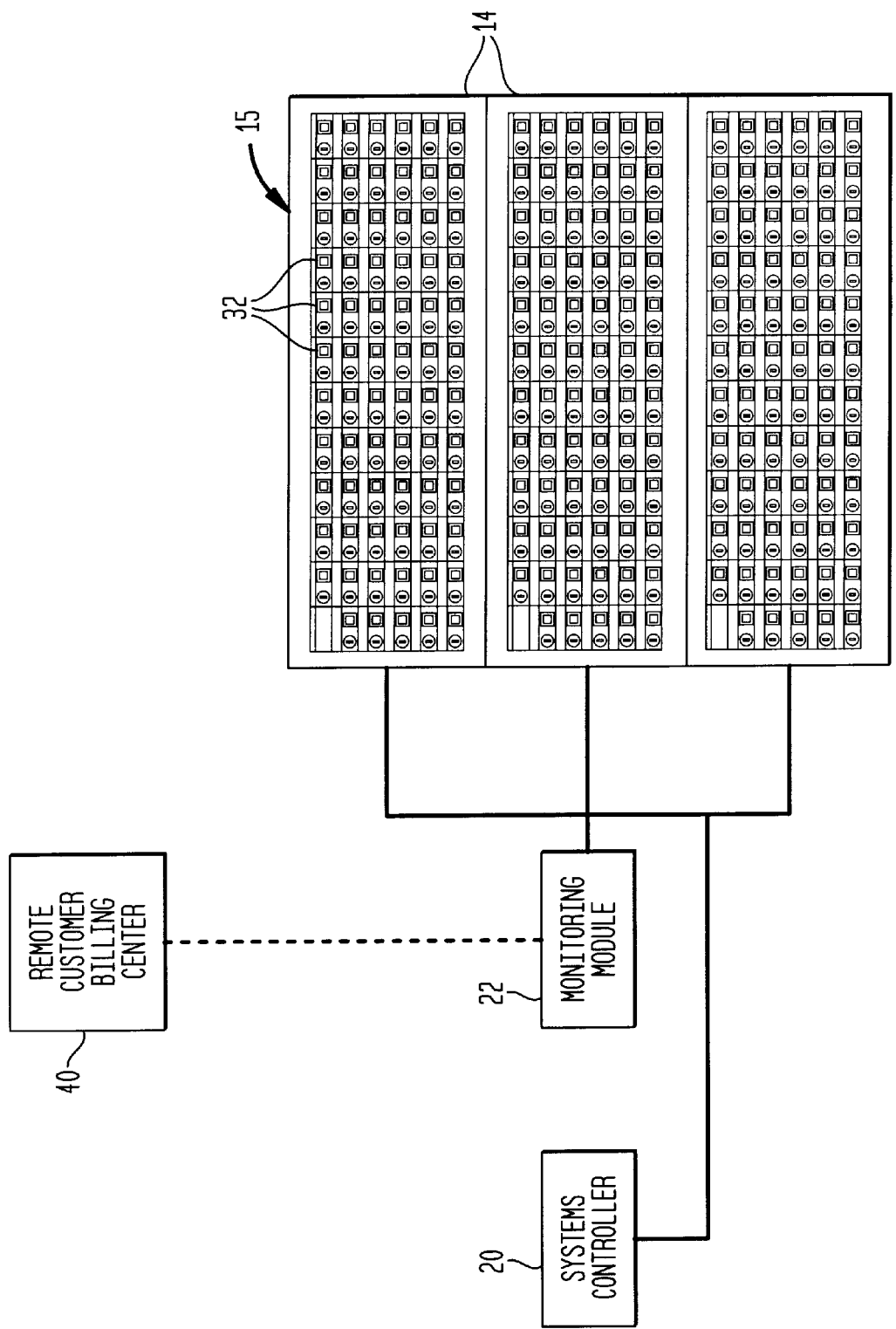
FIG. 2 is a schematic view illustrating an exemplary method of operation of a fiber administration system in accordance with the present invention.

Referring to FIG. 2, a schematic is shown that contains a segment of a fiber administration bay 15. The segment of bay 15, by way of example, shows only three fiber distribution shelves 14. The fiber distribution shelves 14 contain rows and columns of optical connection ports 32 From the schematic of FIG. 2, it can be seen that sensor signals from the various optical connection ports 32 are directed to the systems controller 20. The signals received from the optical connection ports 32 indicate the presence or absence of connector couplings in the various optical connection ports 32. The sensors at the optical connector ports 32 communicate with the systems controller via a smart local area network or some other hard wired interconnection. If the monitoring module is a separate unit that is remote from the fiber distribution shelves 14, the same wired interconnection can also be used to connect the monitoring module 22 to the circuitry of the fiber distribution shelves. However, if the monitoring module is contained within the circuitry of each fiber distribution shelf, obviously no wire interconnection network is required.

The monitoring module 22 is a dedicated controller that monitors the signals received from each of the optical connection ports 32 contained within a fiber administration system. As an optical connection port 32 is used for the first time, the monitoring module 32 records which of the optical connection ports 32 has been used and records the time and date of its first usage. Since a specific optical connection port 32 is being used for the first time, it can be assumed that the owners of the fiber administration system have decided to add a new optical fiber to the collection of optical fibers they are currently using.

The monitoring module 22 contains a modem. Periodically, the monitoring module 22 communicates with the customer billing center of the optical cable supplier or some other remote billing center 40, wherein the monitoring module 22 transmits a status report. If the status report 22 indicates that a new optical fiber is being used, the owner of the fiber administration system is billed accordingly. Consequently, the owner of a fiber administration system only has to pay for the optical fibers that are being used. Furthermore, the owner of the fiber administration system can expand usage at will without the need of running new optical fiber cable. Since the optical fiber cables are already in place, the owner of the fiber administration system need only purchase or lease addition optical fibers within those optical fiber cables.

To prevent the owner of a fiber administration system from severing the modem link 46 between the monitor module 22 and the remote customer billing center 40, the modem within the monitor module 22 can be dialed from the billing center at scheduled times. Alternatively, the monitor module 22 can be programmed to call the billing center at periodic times. If a scheduled call is not either made or received, a technician can be dispatched to check on the status of the monitoring module 22.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. A fiber administration system, comprising:

at least one fiber distribution shelf containing a plurality of optical connection ports that are each coupled to a different external optical fiber, wherein each of said optical connection ports contains a sensor for detecting when that optical connection port is engaged by an optical coupling within the fiber administration system; and a monitor module coupled to said sensor of each of said optical connection ports, wherein said monitor module determines from said sensor if an optical coupling has engaged an optical connection port and records when each of said optical connection ports is first engaged.

2. The system according to claim 1, wherein said monitoring module contains a modem that enables recorded data to be retrieved from said monitoring module from a remote location via a telecommunications link.

3. The system according to claim 1, further including a systems controller coupled to said sensor of each of said plurality of optical connection ports, wherein said monitor module is coupled to each said sensor via said systems controller.

4. The system according to claim 2, wherein said monitor module automatically establishes a telecommunications link with a remote location and transmits recorded data at predetermined periodic intervals.

5. A method of determining how many external optical fibers are being utilized in a fiber administration system, said method comprising the steps of:

terminating a plurality of external optical fibers in a fiber administration system at optical connection ports;

providing sensors at said optical connection ports for sensing when each optical connection port is engaged by another optical fiber coupling;

recording when each sensor signals that an optical connection port has been used for the first time, thereby creating a data record of optical fiber use.

6. The method according to claim 5, further including the step of transmitting said data record to a remote location.

7. The method according to claim 5, wherein said step of terminating includes terminating each of the external optical fibers at an optical connection port on a fiber distribution contained within said fiber administration system.

8. The method according to claim 7, wherein said step of sensing includes providing a sensor on each of said optical connection ports that detects when an optical coupling is inserted into said optical connection ports.

9. The method according to claim 6, wherein said step of transmitting data includes establishing a telecommunications link between a modem at the fiber administration system and said remote location.

10. The method according to claim 5, further including the step of charging an owner of said fiber administration system for the external optical fibers recorded as used in said data record.

11. The method according to claim 7, wherein said data record is recorded my a monitoring module that contains a telecommunications modem.

12. The method according to claim 11, wherein said fiber administration system includes a systems controller that is connected to each said sensor and said monitoring module is coupled to each said sensor via said systems controller.

13. The method according to claim 11, wherein said monitor module automatically establishes a telecommunications link with a remote location and transmits said data record at predetermined periodic intervals.

14. A method of charging an optical fiber network provided according to how many external optic fibers are utilized by that provider, said method comprising the steps of:

providing a plurality of optical fibers to the optical fiber network provider;

terminating said plurality of optical fibers at optical connection ports in a fiber administration system at the location of the optical fiber network provider;

monitoring which of the external optical fibers are used by the optical fiber network provider;

charging the optical fiber network provider based upon the number of external optical fibers used.

15. The method according to claim 14, wherein said at least one display panel contains a label area for each said optical connection port on which indicia can be written to identify said at least one optical connection port.

16. The method according to claim 14 wherein said step of monitoring includes:

providing sensors at said optical connection ports for sensing when each optical connection port is engaged by another optical fiber coupling; and recording when each sensor signals that an optical connection port has been used for the first time, thereby creating a data record of optical fiber use.

17. The method according to claim 16, further including the step of transmitting said data record to a remote location.

18. The method according to claim 17, wherein said step of transmitting data includes establishing a telecommunications link between a modem at the fiber administration system and said remote location.

* * * * *